Dec. 30, 1969  KANSAKU KANEKO ET AL  3,487,248
BALANCED DC MOTOR ROTOR WITH SPARK REDUCING
COMMUTATING ARRANGEMENT
Filed Feb. 17, 1967

*INVENTORS*
Kansaku Kaneko
Toshimasa Fujiwara &
Fumio Asada

BY *Otto John Munz*

ATTORNEY 3,487,248
BALANCED DC MOTOR ROTOR WITH SPARK REDUCING COMMUTATING ARRANGEMENT
Kansaku Kaneko, Toshimasa Fujiwara, and Fumio Asada, Kanagawa-ken, Japan, assignors to Victor Company of Japan, Ltd.
Filed Feb. 17, 1967, Ser. No. 616,805
Claims priority, application Japan, Feb. 17, 1966, 41/9,603; Feb. 18, 1966, 41/13,849
Int. Cl. H02k *13/06, 5/24;* H01r *39/46*
U.S. Cl. 310—220                   12 Claims

ABSTRACT OF THE DISCLOSURE

A rotor for a direct current motor, wherein sparking at the commutator is prevented by forming resistance paths between the commutator-sectors. The resistance paths are through a lamina resistor on an insulating plate or disc whose plane lies perpendicular to the rotor axis. Lamina conductors on the other side of the disc are connected to commutator segments. Balancing material (e.g., solder) is placed on the conductor side of the disc.

FIELD OF THE INVENTION

This invention relates to means for converting electrical energy between the electrical and mechanical state by means of an electromagnetic effect and in particular to means for the reduction of sparking at the commutator portion of a direct current machine, as defined in class 310, subclass 220.

DESCRIPTION OF THE PRIOR ART

In the prior art, as a means of preventing sparks generated in the commutator portion of a direct current motor, a resistance is connected between commutator segments so that large currents and sparks may be reduced when the commutator segments are short-circuited and opened by brushes. However, it is structurally unfeasible to connect a commercial resistance in a small direct current motor. Often a disadvantage thereof is that unbalance of the rotor is increased by such arrangement of resistance and its soldering.

SUMMARY OF THE INVENTION

According to the present invention, an armature winding wound on an armature core, a base plate and a commutator are fitted and secured in turn to the rotary shaft of a rotor. A lamina resistor is formed on one surface of said base plate, and lamina conductors, electrically connected with said resistor and attached to respective commutator segments, are formed on the other surface of said base plate. Furthermore, conductors for adjusting the balance of the rotor are formed integrally with or separately from the above mentioned conductors along the radially inner or outer peripheral edge of the same face of the base plate on which the above mentioned conductors are positioned.

The ends of the armature winding and the respective commutator segments are electrically connected to the conductors corresponding to the above mentioned respective commutator segments and the resistor is connected parallelly between the respective commutator segments so that the above described defects may be eliminated.

The objects of the invention are:

to provide a rotor for direct current motors wherein a resistor is parallelly connected between commutator segments. Thus sparks generated by large curents at the moments when the commutator segments are short-circuited and opened by brushes, may be prevented and trouble and noise caused by such sparks may be avoided;

to provide a rotor with a resistor which can be well balanced and made compact. Such a rotor is very effective specifically in a small direct current motor;

to provide a rotor for direct current motors, wherein the balance can be adjusted by effectively utilizing a base plate provided with the above mentioned resistor.

Other objects and many of the attendant advantages of this invention will be readily appreciated as the same becomes better understood by reference to the following detailed description when considered in connection with the accompanying drawings in which like reference numerals designate like parts throughout the figures thereof.

DESCRIPTION OF THE PREFERRED EMBODIMENTS

Figure 1:
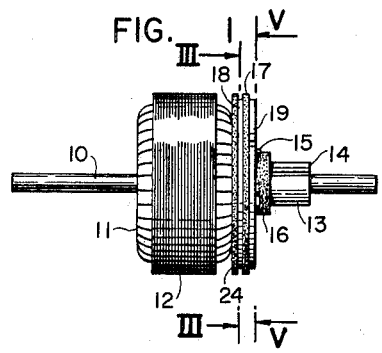
FIGURE 1 is a side view of a rotor for direct current motors according to the present invention.
Figure 2:
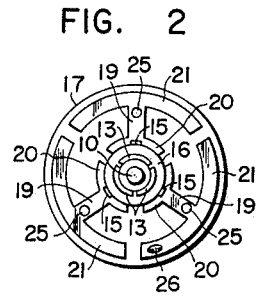
FIGURE 2 is an elevational view of the rotor of FIGURE 1.

FIGURES 1 and 2 illustrate a rotor for direct current motors according to the present invention. There is shown a rotary shaft 10 of the rotor, an armature winding 11 wound on an armature core 12, commutator segments 13 forming a commutator 14 and terminal parts 15 of said commutator segments. A retaining ring 16 is made of an insulator and fitted to the outer periphery of the commutator 14. A base plate 17 is made of an insulator such as a synthetic resin. On one surface of it is formed a resistor 18 in the form of a lamina such as a sheet, a foil or a painted surface. On the opposite surface of the base plate are formed conductors 19 made of copper foil or the like, one for each commutator segment 13. An insulating plate 24 is fitted between the armature winding 11 and the resistor 18 formed on one surface of the base plate 17 so as to insulate the armature winding 11 from the resistor 18. On the armature core 12 is wound the armature winding 11. The insulating plate 24, the base plate 17, having the resistor 18 on one face and conductors 19 on the opposite face, and the commutator 14 are fitted and secured on the rotary shaft 10.

Aligned holes 22 are formed in the resistor 18, base plate 17 and conductors 19. Holes aligned with the holes 22 in the base plate are made in the insulating plate 24. The ends of the armature winding are threaded through the holes in the insulating plate. The holes 22 in the base plate are filled with a conductor 25, such as a solder so that the ends of the armature winding, resistor 18 and conductors 19, may be electrically integrally connected. The inner end parts 20 of the conductors 19 are electrically connected respectively to the terminal parts 15 of the commutator segments by means of solder. A balance adjusting material 26 such as a solder is deposited on the outer end part 21 of the conductor 19 formed along the inside of the peripheral edge of the base plate 17 so as to be integral with the conductor 19 to adjust the balance of the rotor.

Figure 11:
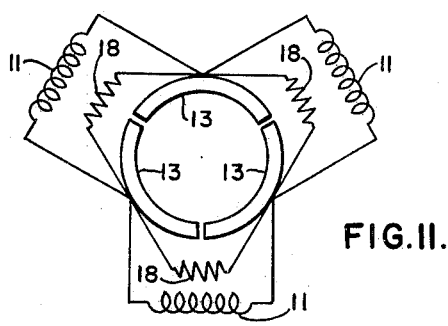
FIGURE 11 is a circuit diagram applicable to the various species of the invention shown.

Thus the base plate, having on one face a lamina resistor and on the opposite face conducting foil, and physically combined into a unit or sheet, with the resistor and conductors connected as shown in FIG. 11, forms an essential part of the improvement in accordance with the present invention.

Thus in accordance with the present invention, because of the connection of the lamina-resistor between the commutator segments, sparks generated in the commutator portion can be greatly reduced and the resistor is well balanced and compact.

Figure 3:
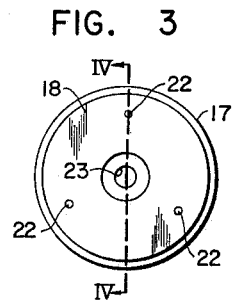
FIGURE 3 is a rear view of a base plate with the resistor side thereof viewed on line III—III of FIG. 1.
Figures 4, 5:
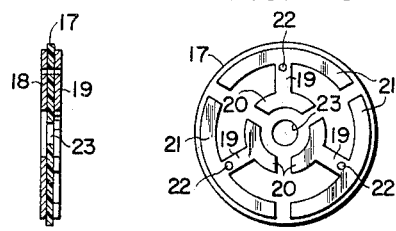
FIGURE 4 is a sectional view on line IV—IV of the base plate of FIG. 3.
FIGURE 5 is an elevational view on line V—V of FIG. 1 of the conductor side of the base plate.

FIGURES 3, 4 and 5 illustrate an embodiment of the base plate. The lamina-resistor 18 is formed on one face of the base plate 17 made of such insulator as a synthetic resin by painting or spraying the surface with a resistance liquid prepared by mixing and kneading powder such as, for example, carbon black or graphite powder with a binder such as silicone varnish. The liquid is applied 0.03 to 0.1 mm. thick and then baked. On the other face of the base plate 17 conductors 19 are located corresponding to the respective commutator segments 13. They are applied by pasting or printing a copper foil or the like, for example, in a thickness of 0.03 to 0.06 mm. Said conductors 19 have inner end parts 20 and outer end parts 21 as illustrated in FIGURE 5. Holes 22 are formed by the alignment of separate holes in resistor 18, base plate 17 and conductors 19. Rotary shaft 10 fits through hole 23 of the base plate 17. The base plate 17 is made of electrically insulating material.

Any desired resistance value can be obtained in the resistor 18 by varying the ratios of the carbon black, graphite and binder to be mixed and kneaded, varying the thickness of the painting or spraying or by varying positions of the holes 22. Thus, when the holes 22 are made close to the inner end parts 20 of the conductors 19, the resistance value is smaller while, when the holes 22 are made close to the outer end parts 21, the resistance value is larger.

Figure 6:
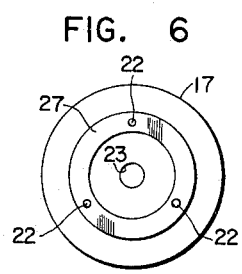
FIGURE 6 is a view showing a second embodiment of the resistor side of the base plate.
Figure 7:
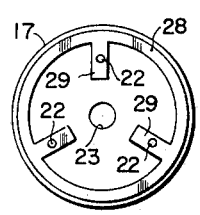
FIGURE 7 is a view showing a third embodiment of the resistor side of the base plate.
Figure 8:
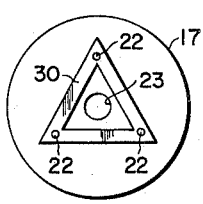
FIGURE 8 is a view showing a fourth embodiment of the resistor side of the base plate.

FIGURES 6, 7 and 8 show other embodiments of the lamina-resistor formed on one surface of the above mentioned base plate. As illustrated in these figures, the resistor may be formed symmetrically only in limited regions, instead of substantially on the entire surface of the base plate, as in FIGURE 3, thus saving resistor material while retaining balance.

In FIGURE 6, a resistor 27 has the form of a ring substantially in the central part of the base plate 17.

In FIGURE 7, resistor 28 has the form of a ring and is situated mainly along the inside of the peripheral edge of base plate 17. Its arms 29, corresponding to the respective commutator segments, project radially inwardly. Resistor 28 may also be formed along the peripheral edge of the hole 23.

In FIGURE 8, resistor 30 has the form of bands linearly extending between holes 22.

Figure 9:
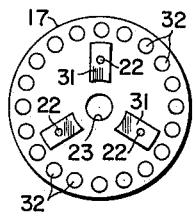
FIGURE 9 is a view showing a second embodiment of the conductor side of the base plate.
Figure 10:
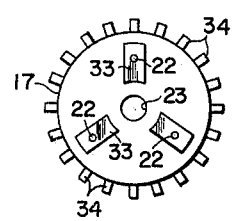
FIGURE 10 is a view showing a third embodiment of the conductor side of the base plate.

FIGURES 9 and 10 show other embodiments of the conductors formed on the opposite face of the base plate.

In FIGURE 9, conductors 31 are placed for association with the respective commutator segments. Other solderable metal pieces 32 are formed separately from said conductors 31 by pasting or printing, for example, copper foils along the inside of the peripheral edge of the base plate 17. With these, the balance of the rotor may be adjusted by depositing solder thereon at selected, balancing locations.

In FIGURE 10, conductors 33 correspond to the respective commutator segments. A plurality of projections extend radially and integrally from the base plate 17. Solderable conductors 34 are formed on said projections by pasting or printing, for example, copper foils. The balance of the rotor may be adjusted by depositing solder on any of said conductors 34 or by removing, in part or entirely, some of the projections on the base plate.

FIGURE 11 is a circuit diagram showing the windings 11 connected to the commutator sectors 13. Resistances 18, connected between the commutator sectors, represent the equivalent resistance of the lamina-resistance.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

We claim:

1. A direct current machine rotor, comprising a rotary shaft, an armature core fitted to said rotary shaft, armature windings wound on said armature core, an electrically insulating base plate mounted to rotate with said armature core in the plane perpendicular to the rotational axis of said armature core and being symmetrical about said rotational axis, said base plate forming on the side adjacent said armature winding a resistor lamina and on the opposite side adjacent to said commutator forming a conductor lamina, an insulating plate mounted to rotate on said shaft with said armature core in a plane perpendicular to the rotational axis of said armature core, said insulating plate interposed with its face between said resistor and said armature windings, a commutator means comprising at least two commutator sectors connected to said armature windings to commutate voltage thereacross and mounted to rotate with said rotary shaft, and holes through said conductor lamina, said base plate, and resistor lamina and said insulating plate, soldering projections through said holes in said conductor to connect said conductor with said resistor and the exposed ends of said armature windings, said resistor and armature windings connected in parallel.

2. A rotor as claimed in claim 1, said conducting lamina having weights attached thereon at points of balancing.

3. A rotor as claimed in claim 1, said weights being deposits of solder.

4. A rotor as claimed in claim 1, said base plate having balancing means attached thereto.

5. A rotor as claimed in claim 4, said balancing means being metal projections distributed symmetrically around said base plate.

6. A rotor as claimed in claim 5, said metal projections having metal deposits attached at points of balancing.

7. A rotor as claimed in claim 1, said holes being distanced from said rotational axis to predetermine the resistance between said commutators.

8. In an electrical machine rotor having armature windings mounted to a rotating shaft, a commutator assembly comprising an electrically insulating base plate mounted to the shaft and having oppositely disposed sides, a resistor lamina forming a fixed interface with a first side of the plate, a conductor lamina having coplanar segments forming a fixed interface with the opposite side of the plate, means connecting preselected points on the resistor lamina to respective segments of the conductor lamina, commutator, means including at least two commutator segments connected to the armature windings to commutate voltage thereacross and mounted to rotate with the rotating shaft, means connecting the conductor segments to respective commutator segments to effect parallel connection of distributed resistance across the windings thereby reducing arcing between the commutator segments.

9. The structure set forth in claim 8 wherein the conducting lamina have weighed means attached thereon at predetermined points for effecting rotor balance.

10. The structure of claim 8 wherein the base plate includes balancing means attached thereto.

11. A rotor as claimed in claim 10, said balancing means being metal projections distributed symmetrically around said base plate.

12. A rotor as claimed in claim 11, said metal projections having metal deposits attached at points of balancing.

References Cited

UNITED STATES PATENTS

| | | | |
|---|---|---|---|
| 2,470,096 | 5/1949 | Eck | 310—236 |
| 3,082,365 | 3/1963 | Mensforth | 310—220 X |
| 3,322,988 | 5/1967 | Ishikawa et al. | 310—220 |

WARREN E. RAY, Primary Examiner

U.S. Cl. X.R.

310—51